(12) United States Patent
Everington, Jr.

(10) Patent No.: US 8,529,170 B2
(45) Date of Patent: Sep. 10, 2013

(54) RETRACTABLE DRILL MOUNTED DUST COLLECTOR

(76) Inventor: Ernest Everington, Jr., Riverside, CA (US)

( * ) Notice: Subject to any disclaimer, the term of this patent is extended or adjusted under 35 U.S.C. 154(b) by 577 days.

(21) Appl. No.: 12/868,065

(22) Filed: Aug. 25, 2010

(65) Prior Publication Data
US 2012/0051858 A1 Mar. 1, 2012

(51) Int. Cl.
*B23B 47/34* (2006.01)

(52) U.S. Cl.
USPC .............................. 408/67; 409/137

(58) Field of Classification Search
USPC ............................ 408/67; 409/137
See application file for complete search history.

(56) References Cited

U.S. PATENT DOCUMENTS

| | | | | |
|---|---|---|---|---|
| 3,583,821 A | * | 6/1971 | Shaub et al. | 408/72 R |
| 3,934,661 A | * | 1/1976 | Sauerwein et al. | 175/211 |
| 4,848,980 A | * | 7/1989 | Broussard | 408/67 |
| 5,061,123 A | | 10/1991 | Broussard | |
| 5,688,082 A | * | 11/1997 | Richardson | 408/67 |
| 5,765,654 A | * | 6/1998 | Burger | 175/211 |
| 6,053,674 A | | 4/2000 | Thompson | |
| 6,887,146 B2 | | 5/2005 | Staas et al. | |
| 7,322,429 B2 | * | 1/2008 | Kim | 173/198 |
| 7,337,684 B1 | * | 3/2008 | Lewis | 73/864.41 |
| 7,396,193 B2 | | 7/2008 | Kesten | |
| 2004/0141820 A1 | | 7/2004 | Mikon et al. | |
| 2007/0292222 A1 | | 12/2007 | Colon | |
| 2009/0172911 A1 | | 7/2009 | Miyanaga | |

FOREIGN PATENT DOCUMENTS

| | | | |
|---|---|---|---|
| DE | 2240346 A1 | * | 2/1974 |
| DE | 2404504 A1 | * | 8/1975 |
| FR | 2383740 A1 | * | 11/1978 |

* cited by examiner

*Primary Examiner* — Daniel Howell
*Assistant Examiner* — Chwen-Wei Su
(74) *Attorney, Agent, or Firm* — Kenneth L. Green

(57) ABSTRACT

A retractable dust containment device includes a forward ring, a collapsible cylindrical center portion, a stretchable rear cover, and draw strings. The forward ring is made from or covered by a plastic or soft material to prevent or reduce marring or damage to a work surface. The center portion includes a spring element pushing the forward ring away from the rear cover, and is enclosed by material to contain dust. The rear cover is a rubber like material and includes a window sized to allow a chuck and rotating drill elements to pass through and seat a non-rotating nose of the drill in the window. Draw strings pass through guides on the perimeter of the rear cover, attach to the forward ring, and are joined behind the rear cover, allowing the forward ring to be drawn to the rear to allow clear viewing on the work surface.

15 Claims, 3 Drawing Sheets

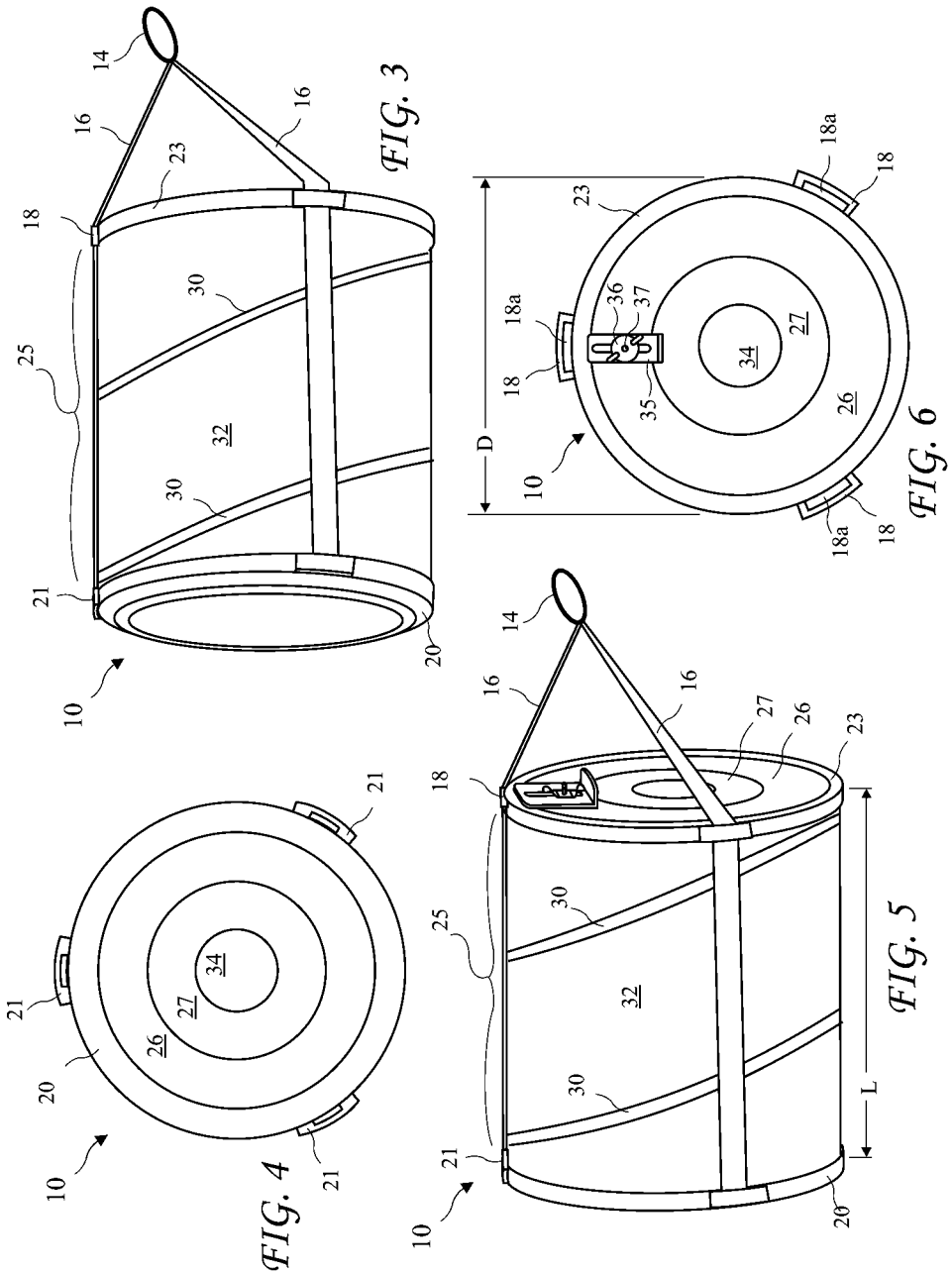

RETRACTABLE DRILL MOUNTED DUST COLLECTOR

BACKGROUND OF THE INVENTION

The present invention relates to dust collecting and in particular to a retractable dust collector which attaches to a hand held drill.

Drilling operations are often performed in either a clean environment where dust control is important or even essential, or in a manner which allows material removed by the drill to fall towards the drill user thus annoying or obstructing the vision of the drill user. In particular, when drilling overhead, material often falls onto a drill user's face or clothing. Such material is often sharp and/or hot.

Known apparatus provides a partial solution to this problem. For Example, US Patent Application Serial No. 2004/0141820 for "Debris Catching Device for Abrasive and Cutting Tools" discloses a bowl held against an overhead surface, and a drill or hole saw operated inside the bowl from a drill below the bowl. Unfortunately, the view of the working area is obstructed or distorted by having to look through the bowl, and the drill user may have difficulty guiding the drilling or cutting. U.S. Pat. No. 6,053,674 for "Dust Collecting Assembly for Drilling Tools" is similar to the apparatus of the '820 application, additionally including a vacuum cleaner attachment, but the problems of the '820 application remain to at least some degree.

U.S. Pat. No. 7,396,193 for "Dust Collector for Drill" discloses a dust collector having a clear cylindrical solid portion and a flexible diaphragm like end allowing entry of an electric drill into the cylinder. As in the case with the '820 application and the '674 patents, the presence of the solid cylinder obstructs or distorts the drill user's view of the work area.

U.S. Pat. No. 6,887,146 for "Dust Extraction Shroud for a Power Tool" discloses a small cylindrical device creating a closed chamber around/over a work area, and including a suction source for capturing material released during drilling and/or cutting. Unfortunately, the apparatus of the '146 patent obstructs viewing the work to some extent.

U.S. Pat. No. 5,061,123 for "Dust Collector Adaptor for Electric Drills" discloses a small collapsible cylinder over the drill chuck and bit and reaching forward to the work material surface to contain material released during drilling and/or cutting. Unfortunately, the device of the '123 patent also obstructs viewing the work to some extent.

Therefore, a need remains for a dust collecting apparatus which facilitates an unobstructed view of the work area when aligning a drill or hole saw.

BRIEF SUMMARY OF THE INVENTION

The present invention addresses the above and other needs by providing a retractable dust containment device which includes a forward ring, a collapsible cylindrical center portion, a rear ring and wall, and draw strings. The forward ring is made from or covered by a plastic or soft material to prevent or reduce marring or damage to a work surface. The center portion includes a spring element pushing the forward ring away from the rear ring, and is enclosed by material to contain dust. The wall is a rubber like material and includes a window sized to allow a chuck and rotating drill elements to pass through and seal against a non-rotating nose of the drill in the window. Draw strings pass through guides on the perimeter of the rear ring, attach to the forward ring, and are joined behind the rear ring, allowing the forward ring to be drawn to the rear to allow clear viewing on the work surface.

In accordance with one aspect of the invention, there is provided a retractable electric drill mounted dust collector. The dust collector includes a forward ring, a longitudinally collapsible cylindrical center portion, a rear ring and wall, and draw strings. The forward ring has a ring cross-section which is preferably round, and is made from or covered by a plastic or soft material to prevent or reduce marring or damage to a work surface. The longitudinally collapsible cylindrical center portion has a forward end attached to the forward ring and preferably has a round cylindrical center portion cross-section similar to the ring cross-section and is covered with a dust resistant material to capture material released during use of the electric drill. The rear ring is attached to a rearward end of the center portion and has a preferably round rear ring cross-section similar to the ring cross-section. The wall includes a stretchable window for receiving a non-rotating nose of an electric drill. The forward ring is biased forward away from the rear ring to extend the longitudinally collapsible cylindrical center portion to reach a work surface. The draw strings have forward string ends attached to the forward ring, pass through guides attached to the perimeter of the rear ring, and rearward ends attached to a pull. The forward ring normally resides in an extended position with the cylindrical center portion extended away from the rear ring when the pull is released, and the forward ring resides proximal to the rear ring with the cylindrical center portion collapsed allowing a drill user to view the work surface, when the draw strings are drawn rearward.

In accordance with another aspect of the invention, there is provided a retractable electric drill mounted dust collector useable against a vertical surface (e.g., a wall), or a horizontal surface (e.g., a ceiling). The dust collector slides over the nose of the electric drill and has a collapsible cylindrical center portion which is collapsed to position a drill bit or hole saw, and expanded to create a closed volume for capturing material released during drilling and/or cutting.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3 is a side perspective view of the retractable drill mounted dust collector detached from the electric drill.

FIG. 4 is a front view of the retractable drill mounted dust collector.

FIG. 5 is a side perspective view of the retractable drill mounted dust collector detached from the electric drill.

FIG. 6 is a rear view of the retractable drill mounted dust collector.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
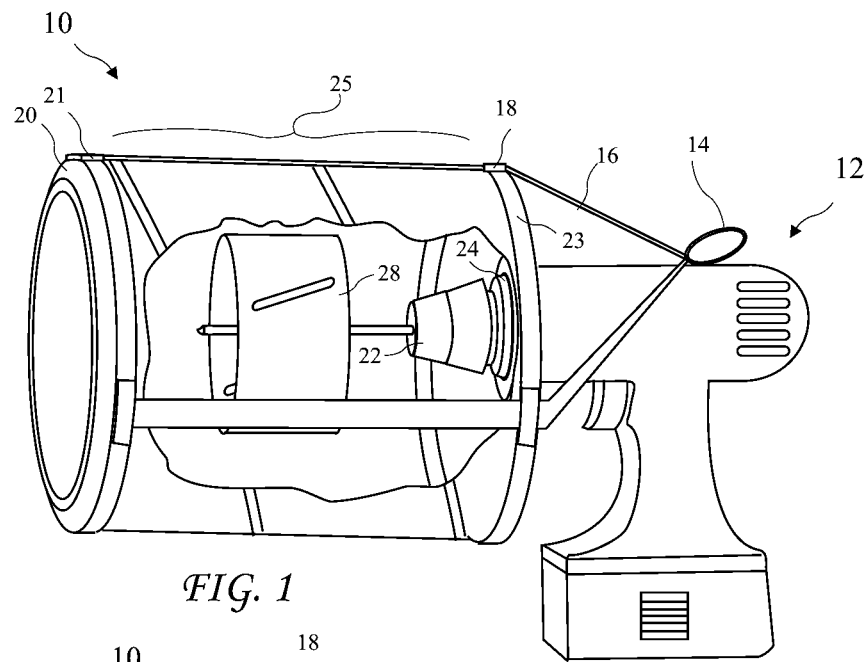
FIG. 1 is a side perspective view of a retractable drill mounted dust collector according to the present invention mounted to an electric drill, with the retractable drill mounted dust collector partially cut away to show a hole saw attached to the electric drill.
Figure 2:
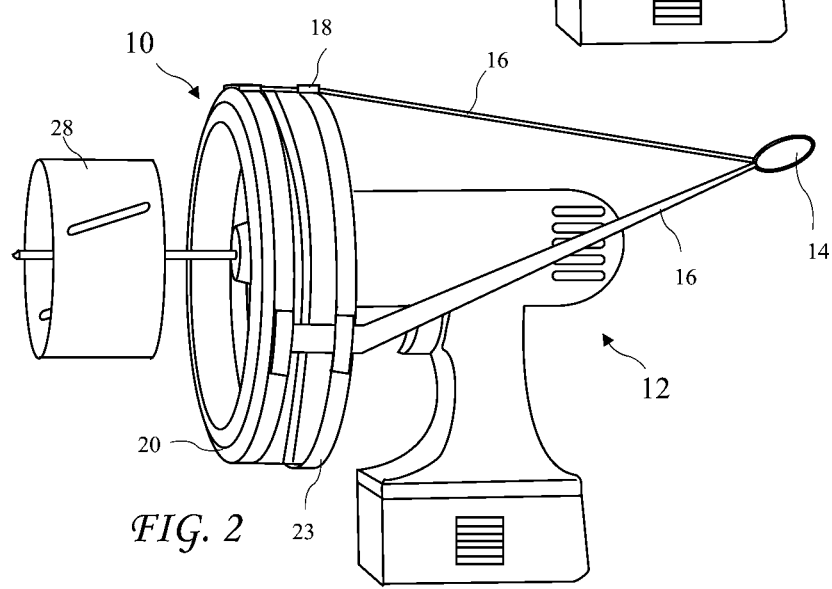
FIG. 2 is a side perspective view of the retractable drill mounted dust collector mounted to the electric drill with the retractable drill mounted dust collector retracted.

A side perspective view of a retractable drill mounted dust collector 10 according to the present invention mounted to an electric drill 12, with the retractable drill mounted dust collector 10 partially cut away to show a hole saw 28 attached to a rotating drill chuck 22 of the electric drill 12 is shown in FIG. 1, and a side perspective view of the dust collector 10 mounted to the electric drill 12 with the dust collector 10 retracted is shown in FIG. 2. The dust collector 10 includes a forward ring 20, a longitudinally collapsible cylindrical center portion 25, a rear ring 23, rigid wall 26, and pliable wall 27 attached to the rear ring 23. The forward ring 20 may be drawn rearward towards the rear ring 23 by pulling draw strings 16. The retractable drill mounted dust collector 10 is equally useful mounted to a hammer drill.

The pliable wall 27 is preferably flat and attached to the rigid wall 26 which is attached to around the entire perimeter of the wall 26 forming a seal to prevent the escape of material released during drilling and/or cutting. A non-rotating nose 24 of the electric drill 12 is inserted into the dust collector 10 through a window 34 (see FIGS. 4 and 6) in the wall 26 of the rear ring 23 of the dust collector 10. The pliable wall 27 is preferably made from a stretchable material and more preferably from a rubber material. The window 34 is preferably round and sized to allow a portion of the non-rotating nose 24 of the drill to press into the window, preferably forming a seal between the nose 24 and wall 26.

The draw strings 16 are preferably three draw strings spaced apart around the dust collector 10, and more preferably spaced apart by 120 degrees. The draw strings 16 are preferably attached to the forward ring 10 at forward string ends by stitching 40 (see FIG. 9), and may include reinforcing 21 jointly stitched with the draw strings 16 to the forward ring 20. The draw string 16 preferably pass through guides 18 attached to the rear ring 23 (also see FIG. 6) and the draw strings 16 may have loose rearward ends or be jointly attached to a pull 14. The pull 14 is preferably a ring made of metal, plastic, or some other hard material, or may be fabric, plastic, rubber, or the like.

A side perspective view of the dust collector 10 detached from the electric drill 12 is shown in FIG. 3, a front view of the dust collector 10 is shown in FIG. 4, a second side perspective view of the dust collector 10 detached from the electric drill 12 is shown in FIG. 5, and a rear view of the dust collector 10 is shown in FIG. 6. The longitudinally collapsible cylindrical center portion 25 of the dust collector 10 preferably includes a spiral (or coil) spring 30 integral to the center portion 25 and biasing the forward ring 20 forward and away from the rear ring 23. The longitudinally collapsible cylindrical center portion 25 is preferably fabric covered, for example, vinyl fabric, nylon fabric, or fabric made from synthetic fibers, and is more preferably covered in vinyl fabric. The spring 30 is preferably encased (or sewn into) the fabric covering. An adjustable guide or stop 35 is adjustably attached to a rear surface of the wall 26. The adjustable guide or stop 35 is positioned against the electric drill 12 to help set the position of the dust collector 10 on the electric drill 12, and fastener 36 (for example, wing nut) may be tightened onto a stud (or screw) 37 attached to the rigid ring 26 to hold the position of the adjustable guide or stop 35. The guides 18 define passages 18a for the draw strings 16.

The dust collector 10 has a length L and the diameter D. The length L is preferably approximately twelve inches and the diameter D is preferably approximately eight inches, and is designed to allow use of a hole saw in addition to drill bits.

While a spiral spring 30 sown into fabric covering the longitudinally collapsible cylindrical center portion 25 is a preferred embodiment of the present invention, a dust collector 10 including any structure for biasing the front ring 20 forward is intended to come within the scope of the present invention. For example, the longitudinally collapsible cylindrical center portion 25 may be constructed of a material having a memory and self biasing toward an extended shape.

Figure 7:
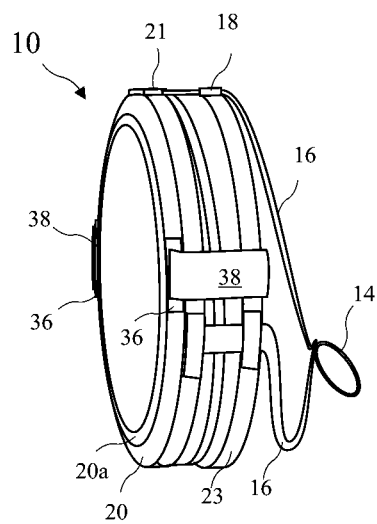
FIG. 7 is a side perspective view of the retractable drill mounted dust collector with the retractable drill mounted dust collector retracted for storing.

A side perspective view of the dust collector with the forward ring 20 retracted for storing is shown in FIG. 7. For storage, the dust collector 10 may include hook and loop fastener material 36 and 38 to jointly retain the dust collector in a retracted (or compressed) condition.

Figure 8:
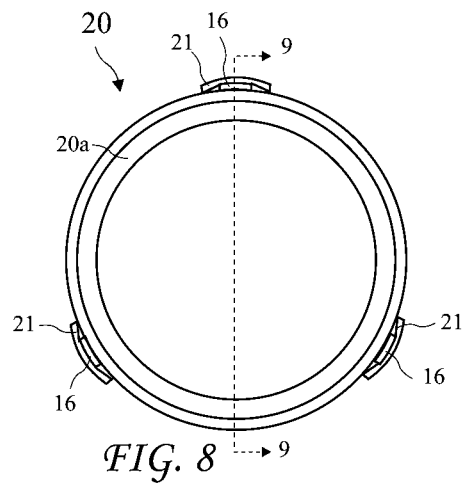
FIG. 8 is a front view of a forward ring of the retractable drill mounted dust collector according to the present invention.
Figure 9:
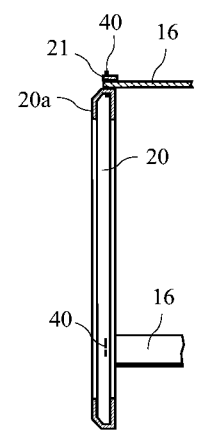
FIG. 9 is a cross-sectional view of the forward ring of the retractable drill mounted dust collector according to the present invention taken along line 9-9 of FIG. 8.

A front view of the forward ring 20 of the retractable drill mounted dust collector 10 is shown in FIG. 8 and a cross-sectional view of the forward ring 20 taken along line 9-9 of FIG. 8 is shown in FIG. 9. The forward ring 20 has a face 20a for placing against a work surface. The draw strings 16 are preferably jointly stitched with reinforcing 21 to the forward ring 20.

While the invention herein disclosed has been described by means of specific embodiments and applications thereof, numerous modifications and variations could be made thereto by those skilled in the art without departing from the scope of the invention set forth in the claims.

I claim:

1. A retractable electric drill mounted dust collector comprising:
    a forward ring having a ring cross-section;
    a longitudinally collapsible cylindrical center portion attached at a forward end to the forward ring and having a cylindrical center portion cross-section similar to the ring cross-section and covered to capture material released during use of the electric drill;
    a rear ring attached to a rearward end of the longitudinally collapsible cylindrical center portion and having a rear ring cross-section similar to the ring cross-section, the forward ring biased forward away from the rear ring to extend the longitudinally collapsible cylindrical center portion;
    a wall attached to the rear ring;
    a window in the wall allowing entry of the electric drill into the retractable electric drill mounted dust collector; and
    draw strings having forward string ends attached to the forward ring and rearward ends extending back from the forward ring, the forward ring residing in an extended position with the cylindrical center portion extended away from the rear ring when the draw strings are released, and the forward ring residing proximal to the rear ring with the cylindrical center portion collapsed allowing a drill user to view a work surface, when the draw strings are drawn rearward.

2. The retractable electric drill mounted dust collector of claim 1, wherein the ring cross-section is a circle.

3. The retractable electric drill mounted dust collector of claim 1, further including draw string guides attached to the rear ring, the draw strings passing through the rear guides.

4. The retractable electric drill mounted dust collector of claim 3, wherein the draw strings comprise at least three spaced apart draw strings.

5. The retractable electric drill mounted dust collector of claim 4, wherein the draw strings comprise three draw strings spaced apart approximately 120 degrees.

6. The retractable electric drill mounted dust collector of claim 1, wherein the forward ring is biased away from the rear ring by a spiral spring.

7. The retractable electric drill mounted dust collector of claim 6, wherein the spiral spring is covered by a cloth like material.

8. The retractable electric drill mounted dust collector of claim 6, wherein the spiral spring is covered by a vinyl fabric.

9. The retractable electric drill mounted dust collector of claim 1, wherein the wall is rubber.

10. The retractable electric drill mounted dust collector of claim 1, wherein:
    the wall comprises a rigid outer wall attached to the rear ring and a smaller diameter pliable inner wall attached to the rigid outer wall and defining the window; and
    the inner wall is deformable to allow a non-rotating nose of the electric drill to press into the window in the inner wall.

11. The retractable electric drill mounted dust collector of claim 10, wherein the outer rigid wall is made from metal and the inner wall is made from rubber.

12. The retractable electric drill mounted dust collector of claim 1, further including an adjustable stop attached to a rear surface of the wall, the stop vertically adjustable to rest against a top surface of the electric drill.

13. A retractable electric drill mounted dust collector comprising:
    a forward ring having a ring cross-section;
    a longitudinally collapsible cylindrical center portion attached at a forward end to the forward ring and having a cylindrical center portion cross-section similar to the ring cross-section and covered to capture material released during use of the electric drill;
    a rear ring attached to a rearward end of the longitudinally collapsible cylindrical center portion and having a rear ring cross-section similar to the ring cross-section, the forward ring biased forward away from the rear ring to extend the longitudinally collapsible cylindrical center portion;
    draw string guides attached to the rear ring;
    a wall comprising a rigid outer wall attached to the rear ring and a smaller diameter pliable inner wall attached to the rigid outer wall and having an inside diameter defining a window, the inner wall deformable to allow a non-rotating nose of the electric drill to press into the window in the inner wall; and
    three angularly spaced apart draw strings having forward string ends attached to the forward ring and rearward ends extending back from the forward ring and slidable through the draw string guides attached to the rear ring, the forward ring residing in an extended position with the cylindrical center portion extended away from the rear ring when the draw strings are released, and the forward ring residing proximal to the rear ring with the cylindrical center portion collapsed allowing a drill user to view a work surface, when the draw strings are drawn rearward.

14. A retractable electric drill mounted dust collector comprising:
    a round forward ring having a ring cross-section;
    a longitudinally collapsible cylindrical center portion comprising a fabric covered spiral spring urging the center portion to an extended position, the center portion attached at a forward end to the forward ring and having a cylindrical center portion cross-section similar to the ring cross-section and covered to capture material released during use of the electric drill;
    a round rear ring attached to a rearward end of the longitudinally collapsible cylindrical center portion and having a rear ring cross-section similar to the ring cross-section, the forward ring biased forward away from the rear ring by the spiral spring;
    draw string guides attached to the rear ring and defining draw string passages;
    a wall attached to the rear ring and comprising:
        a rigid outer wall attached to the rear ring; and
        a smaller diameter pliable inner wall attached to the rigid outer wall and having an inside diameter defining a window, the inner wall deformable to allow a non-rotating nose of the electric drill to press into the window in the inner wall; and
    three angularly spaced apart draw strings having forward string ends attached to the forward ring and rearward ends extending back from the forward ring and slidable through the draw string passages attached to the rear ring, the forward ring residing in an extended position with the cylindrical center portion extended away from the rear ring when the draw strings are released, and the forward ring residing proximal to the rear ring with the cylindrical center portion collapsed allowing a drill user to view a work surface, when the draw strings are drawn rearward.

15. The retractable electric drill mounted dust collector of claim 14, further including an adjustable stop attached to a rear surface of the rigid outer wall, the stop vertically adjustable to rest against a top surface of the electric drill.

* * * * *